United States Patent [19]
Boles et al.

[11] Patent Number: 6,163,377
[45] Date of Patent: *Dec. 19, 2000

[54] COLORIMETER

[75] Inventors: John A. Boles, Fishers; Jay M. Eastman, Pittsford; William J. Fox, Rochester; Roger J. Greenwald, Holley; Robert J. Hutchison, Pittsford; Cormic K. Merkle, Rochester, all of N.Y.

[73] Assignee: CV US, Inc., Lawrenceville, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 09/360,051

[22] Filed: Jul. 23, 1999

[51] Int. Cl.[7] ........................................................ G01J 3/51
[52] U.S. Cl. .......................... 356/402; 356/405; 356/419; 250/226; 348/191
[58] Field of Search ..................................... 356/402, 405, 356/406, 407, 416, 419; 250/226; 348/184, 191

[56] References Cited

U.S. PATENT DOCUMENTS

| | | |
|---|---|---|
| 3,645,633 | 2/1972 | Kisatsky . |
| 3,804,531 | 4/1974 | Kosaka et al. . |
| 3,998,555 | 12/1976 | Baab . |
| 4,150,898 | 4/1979 | Suga ......................................... 356/407 |
| 4,334,782 | 6/1982 | Thornton, Jr. et al. . |
| 4,401,611 | 8/1983 | Mansolillo et al. . |
| 4,551,748 | 11/1985 | Mattle . |
| 4,643,568 | 2/1987 | Forsberg . |
| 4,653,925 | 3/1987 | Thorton, Jr. . |
| 4,758,085 | 7/1988 | Lequime et al. . |
| 4,773,761 | 9/1988 | Sugiyama et al. . |
| 4,834,541 | 5/1989 | Yamaba . |
| 4,902,136 | 2/1990 | Mueller . |
| 4,989,982 | 2/1991 | Osaki . |
| 5,168,320 | 12/1992 | Lutz et al. ............................. 356/402 |
| 5,272,518 | 12/1993 | Vincent ................................... 356/405 |
| 5,477,326 | 12/1995 | Dosmann . |
| 5,499,040 | 3/1996 | McLaughlin et al. . |
| 5,537,516 | 7/1996 | Sherman et al. ........................ 395/109 |
| 5,739,914 | 4/1998 | Chida et al. . |
| 5,745,229 | 4/1998 | Jung et al. . |
| 5,757,438 | 5/1998 | Pierce, III . |
| 5,792,049 | 8/1998 | Eppstein . |
| 5,818,586 | 10/1998 | Lehto et al. . |
| 5,883,708 | 3/1999 | Jung et al. . |
| 5,892,585 | 4/1999 | Lianza et al. . |
| 5,926,282 | 7/1999 | Knobloch et al. . |

FOREIGN PATENT DOCUMENTS

WO 99/10866  3/1999  WIPO .

OTHER PUBLICATIONS

D.D. Wharmby, Journal of Physics, E: Scientific Instruments, 1975, vol. 8, pp. 41–44.

R.W.G. Hunt, Measuring Color, 2nd Edition, Ellis Horwood Ltd. Publisher, 1991, pp. 178–181.

*Primary Examiner*—F. L. Evans
*Attorney, Agent, or Firm*—Calfee, Halter & Griswold LLP

[57] ABSTRACT

A colorimeter capable of calibrating color monitors, whether having cathode ray tube or liquid crystal (LCD) displays, is provided by a photometric array of photodetector and optical filter pairs. The filters include long-pass, edge filters which cover overlapping regions at the upper end of the visible spectrum and a filter which covers the entire visible spectrum. The outputs of the photodetectors are digitally synthesized to provide a response which mimics the response established by the Commission Internationale de l'Eclairage (CIE) xyz (bar) functions almost perfectly. The response which is mimicked may be represented by the CIE color matching functions. The pairs and the associated components are mounted on a printed circuit board captured in a clamshell housing and having an array of apertures which define angularly constrained fields of view of a surface from which the light, to be colormetrically analyzed, emanates. The colorimeter is capable generally of measuring the color characteristics, especially the color temperatures of radiation radiating and reflecting bodies (sources), including so-called black bodies.

44 Claims, 16 Drawing Sheets

COLORIMETER

DESCRIPTION

The present invention relates to colorimeters for measuring the color content of light and has a response mimicking the response to color of the human eye, as may be represented by the CIE color matching functions. The invention is especially suitable for calibrating color monitors and color video displays, whether of the cathode ray tube or LCD type. The invention is also applicable generally for measuring the color characteristics of other sources (emissive or reflective) of illumination, such as the color temperature thereof.

It has been discovered in accordance with the invention that a colormetric response which accurately mimics the response to color of the human eye can be modeled with edge filters which pass the upper end of the visible spectrum and which are in overlapping relationship, when such filters are paired with photodetectors. The response can be digitally synthesized from the output of the photodetectors. The measurements made with the colorimeter may be used to calibrate a color monitor or display, utilizing techniques known in the art. The mechanical and electrical design makes the inventive colorimeter readily manufacturable at cost competitive with contemporary colorimeters, and also usable in a way compatible with the use of such contemporary colorimeters.

Accurate colorimetry has not been provided by contemporary colorimeters suitable for use by non-technical users and outside of a laboratory environment. As discussed in the text *Measuring Colour*, Second Edition by R. W. G. Hunt (published by Ellis Horwood Limited, 1991), contemporary colorimeters using filtered photo cells have not provided accurate colorimetry in that " . . . it is usually impossible to find filters that, when combined with the spectral sensitivity of the unfiltered photo cell, result in a perfect match to the $\bar{x}$ ($\lambda$), $\bar{y}$ ($\lambda$), and $\bar{z}$ ($\lambda$) functions." Also as discussed in the Hunt text, even with narrow intervals over the visible spectrum and even with the use of optimized weights to minimize errors, accurate colorimetry has not been achieved. (See, pages 178–181 of the Hunt text). Such colorimeters as discussed by Hunt are represented by Vincent, U.S. Pat. No. 5,272,518, issued Dec. 21, 1993, Suga, U.S. Pat. No. 4,150,898, issued Apr. 24, 1979, and Lutz, et al., U.S. Pat. No. 5,168,320, issued Dec. 1, 1992.

The present invention provides an improved filter colorimeter which utilizes edge filters as well as digital processing and enhancement to provide a response which mimics the human eye response so as to obtain accurate colorimetry.

The colorimeter provided by the invention also improves accuracy of colorimetry through the use of apertures which baffle the light being measured and limit off color, high angle emissions, which are common from LCD displays.

The mechanical and electro-optical structure of the colorimeter provided by the invention enables it to be used in a manner compatible with contemporary colorimeters, as well as to be manufacturable at a sufficiently low cost to be priced competitively with such colorimeters.

Briefly described, a colorimeter embodying the invention has a plurality of optical filter/photodetector pairs, preferably in an array in which each pair receives light over a field of view which is limited. Generally, the field of view is angularly constrained so as to prevent color-distorted, higher angle rays or emissions from the emissive surface from reaching the photodetectors. The pairs have a responsivity which extends over a different overlapping wavelength region at long wavelength ends of the visible spectrum. Edge filters may be used together with photodetectors, preferably providing digital outputs to obtain this responsivity. A translator which digitally processes the photodetector outputs converts the responsivity of the pairs into a responsivity mimicking the color matching functions representing the responsivity of the human eye. These may be the CE Commission Internationale de l'Eclairage $\bar{x}$, $\bar{y}$, and $\bar{z}$ functions from which the CIE tri-stimulus values, X, Y, Z, may be obtained by conventional processing of the functions (See, for example, the Vincent patent cited above and McLaughlin, U.S. Pat. No. 5,499,040, issued Mar. 12, 1996), thereby facilitating the use of the colorimeter for calibrating color monitors and color video and other displays.

The foregoing and other features and advantages of the invention will become more apparent from a reading of the following description in connection with the accompanying drawings in which:

FIG. 1 is an exploded view in perspective showing the principal components of a colorimeter in accordance with the presently preferred embodiment of the invention;

FIG. 1*a* is a plan view of the printed circuit board component shown in FIG. 1;

DETAILED DESCRIPTION

Figure 1:
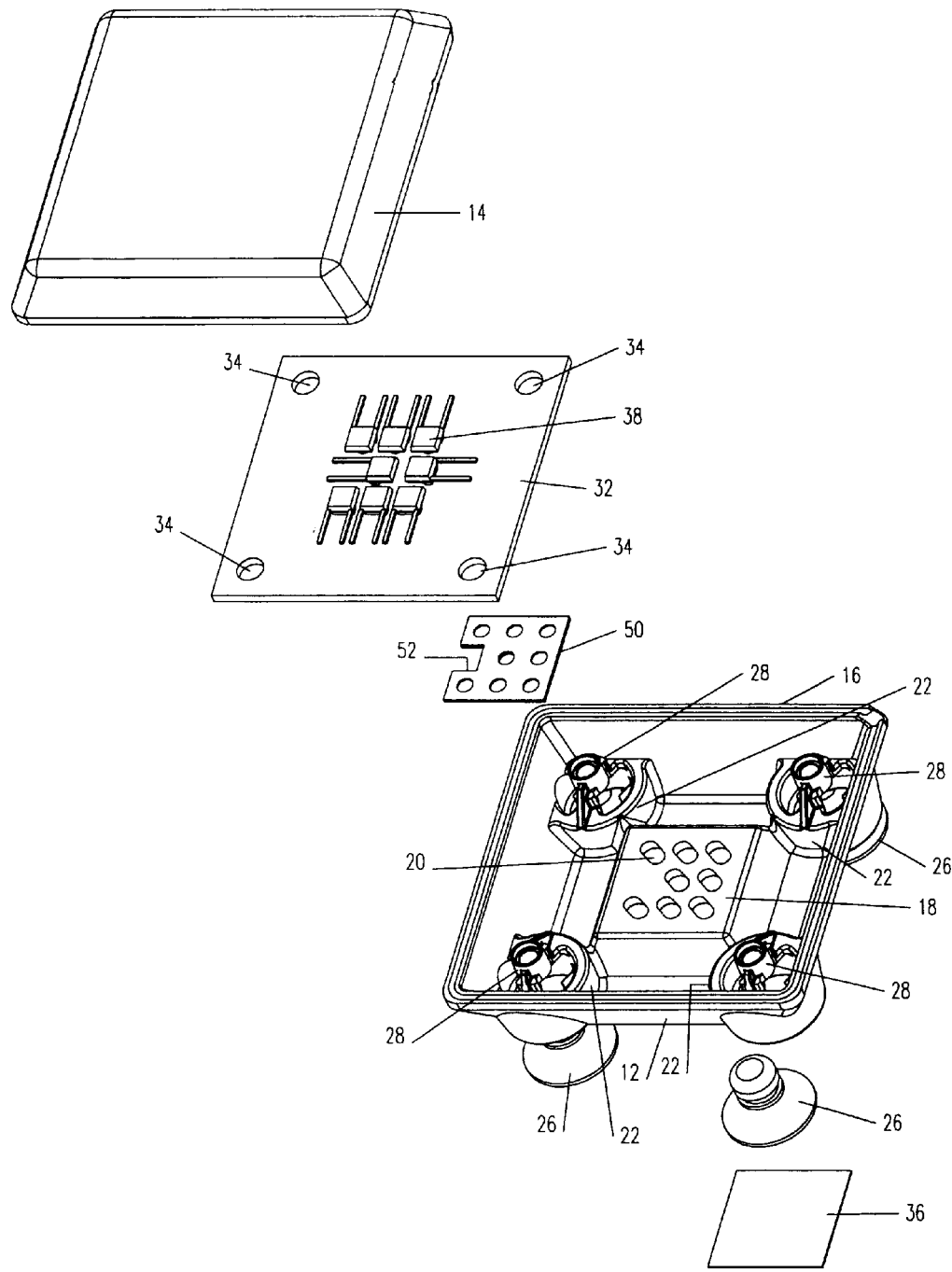
Figure 1A:
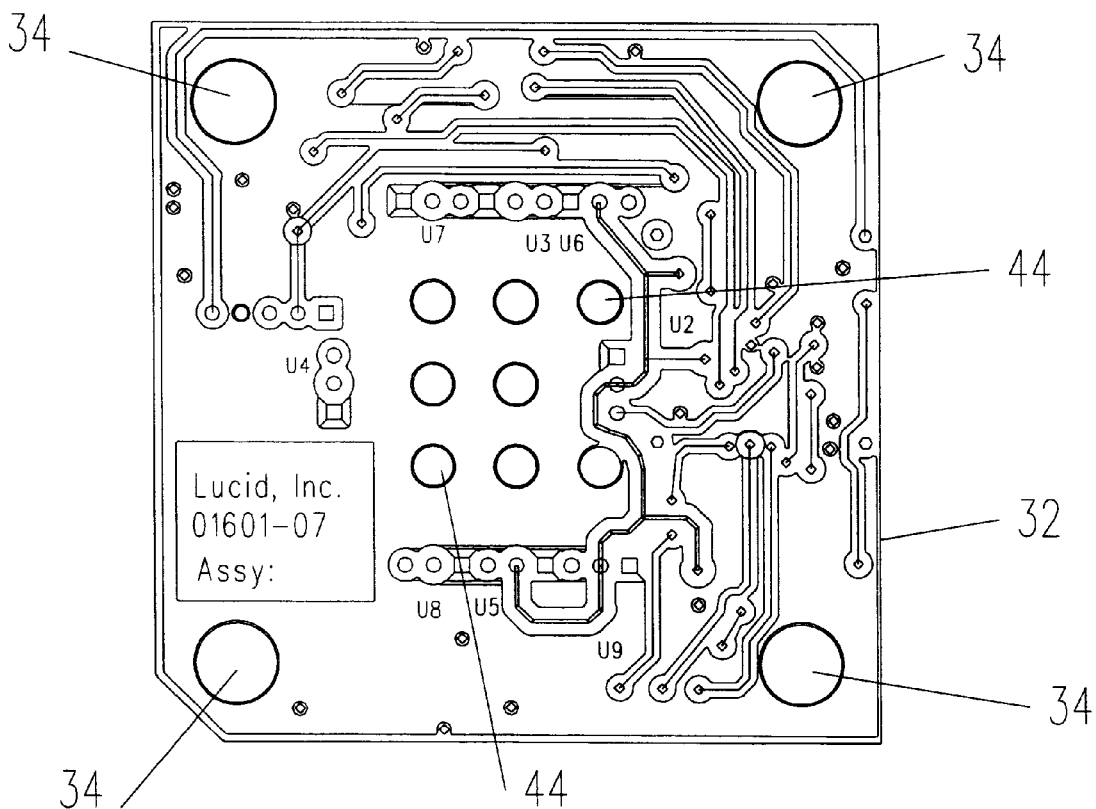

Referring to FIGS. 1, 2, 3, 4 and 5, there is shown a colorimeter embodying the invention, the colorimeter is a unitary assembly of a housing 10 made up of a front shell 12 and a rear shell 14 which are joined at a tongue and groove connection 16. A generally rectangular recessed wall 18 has a matrix of apertures 20 which may be evenly spaced from each other by the same distances along X and Y coordinates paralleling perpendicular edges of the wall 18. In the illustrated embodiment, the shape of the apertures is oblong and their longitudinal axes are at approximately 45° to the X and Y coordinates, that is to the edges of the wall 18. The longitudinal axis is arranged, when the colorimeter is in use in making colormetric measurements of a color monitor screen, at approximately 45° from horizontal. This enables sufficient light (photons) to pass through the apertures even with limited fields of view. Such limitation in the field of view is discussed in connection with FIGS. 6 and 7 below. Generally, the fields of view of each of the apertures 20 are designed to avoid cross-talk between different photodetector 38 and filters 50 (discussed in greater detail below). The constrained fields of view avoid the effect of color changes with angle, especially in the vertical direction which occurs with LCD screens. It has been found that oblong apertures with parallel sides and circular ends in the orientation discussed above, suitably restrict the fields of view.

The front shell 12 has features 22 projecting inwardly at each of the four corners of the shell 12. These features have circular tongues 24 which capture retaining grooves in soft, rubber suction cups 26. The suction cups provide light pressure against the screen of color monitor or display, from which light enters the colorimeter via the apertures 20.

Tubular posts 28 are molded of the same plastic material as the shell 16 and have axes extending generally perpendicular to the wall 18 and are parallel to the optical axes through the apertures 20. These posts receive complimentary posts 30 which fit inside the posts 28 at the ends thereof. A plate provided by a printed circuit board 32 has circular holes 34 through which the posts 28 enter and capture the board 32 between the shells 12 and 14 when the shells are assembled together. Blind holes 34 in the posts 30 may be threaded and screws (not shown) which enter through the holes in the posts 28 are received in the threaded holes 34 for holding the colorimeter components assembled. A transparent film or sheet 36 is disposed over the front side of the wall 18 and closes the apertures 20. The tongue and groove connection 16 and the sheet 36 thus provide a closed body which is light-tight, except for light which passes through the sheet 36 and apertures 20 for measurement by the colorimeter.

The printed circuit board has an array of photodetectors 38 matching the array of apertures 20 in number and positional relationship. Extending from the back wall of the shell 14 are a matrix of ribs 40, some of which, 42, extend a distance sufficient to bring these ribs 42 into contact with the backside of the printed circuit board 32. These ribs 42 form generally rectangular compartments which enclose the photodetectors 38 and prevent leakage of light therebetween, thereby further eliminating crosstalk between light passing through the apertures 20 and reaching the photodetectors 38. The ribs 40 also serve to strengthen the shell 14.

The photodetectors 38 are preferably light-to-frequency converters which combine a photodiode and a current-to-frequency converter on a single chip. Such devices are available from Texas Instruments of Dallas, Tex., under such part numbers as TSL 235. They provide digital outputs (pulse trains), the repetition rate or frequency of which is proportional to light level.

Figure 2:
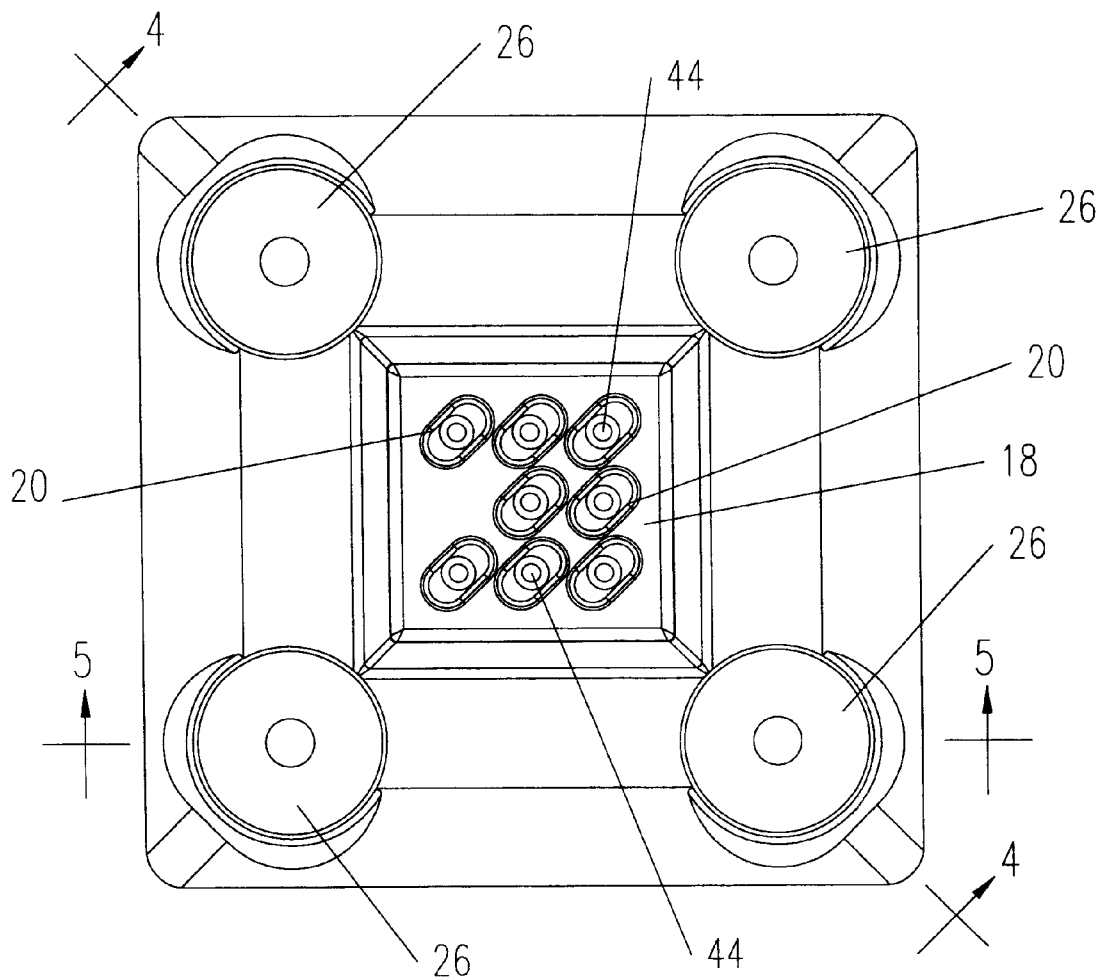
FIG. 2 is a bottom view of the colorimeter shown in FIG. 1.
Figure 3:
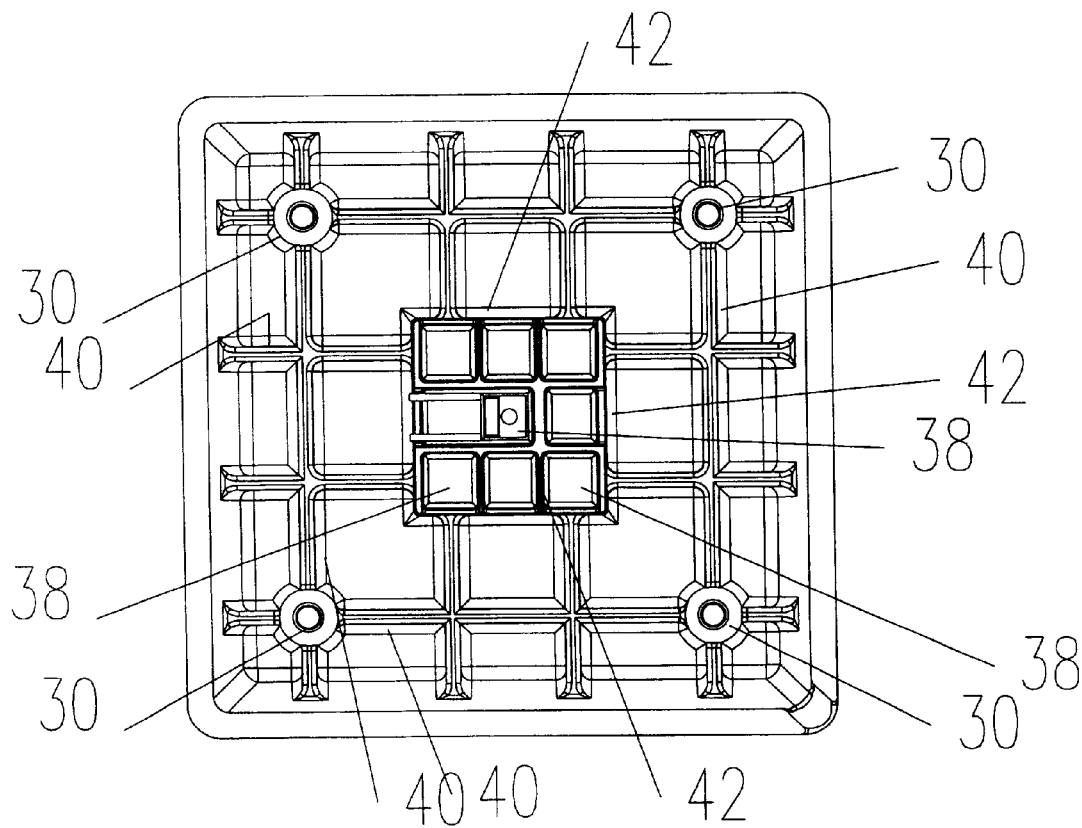
FIG. 3 is a sectional view of the colorimeter shown in FIGS. 1 and 2, the section being taken along the line 3—3 in FIG. 4.
Figure 4:
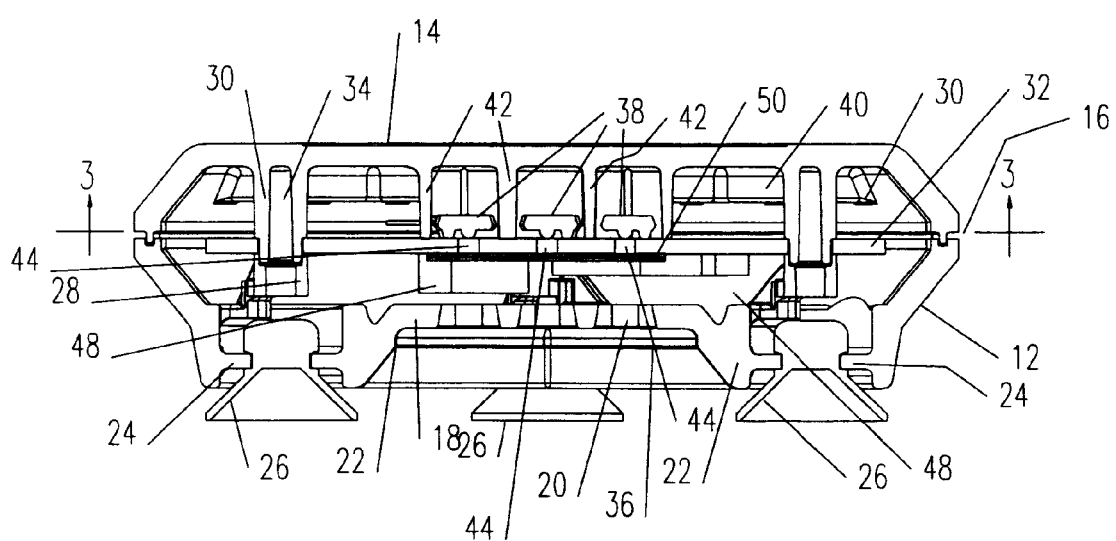
FIG. 4 is a sectional view of the colorimeter shown in FIG. 1, the section being taken along the line 4—4 in FIG. 2.
Figure 5:
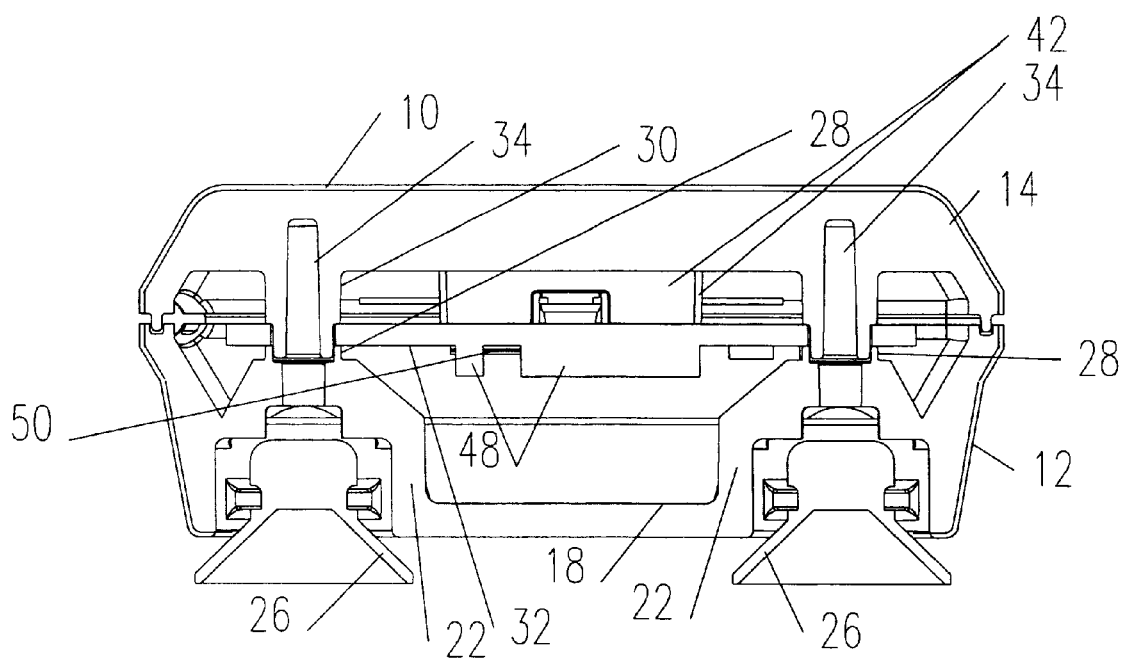
FIG. 5 is a sectional view of the colorimeter show in the preceding figures, the section being taken along the line 5—5 in FIG. 2.
Figure 8:
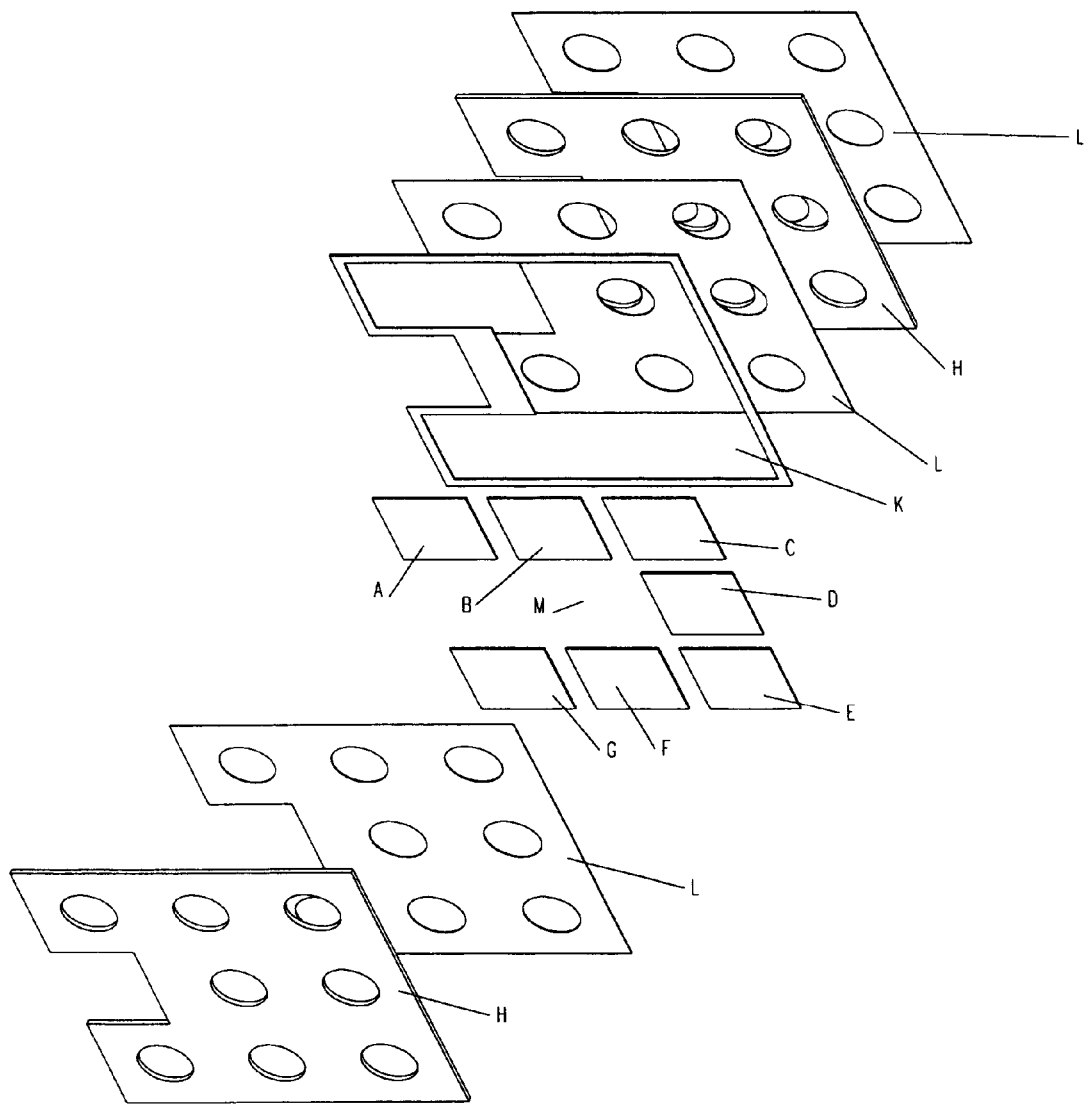
FIG. 8 is an exploded view in perspective of the filter unit used in the colorimeter shown in the preceding figures.
Figure 9:
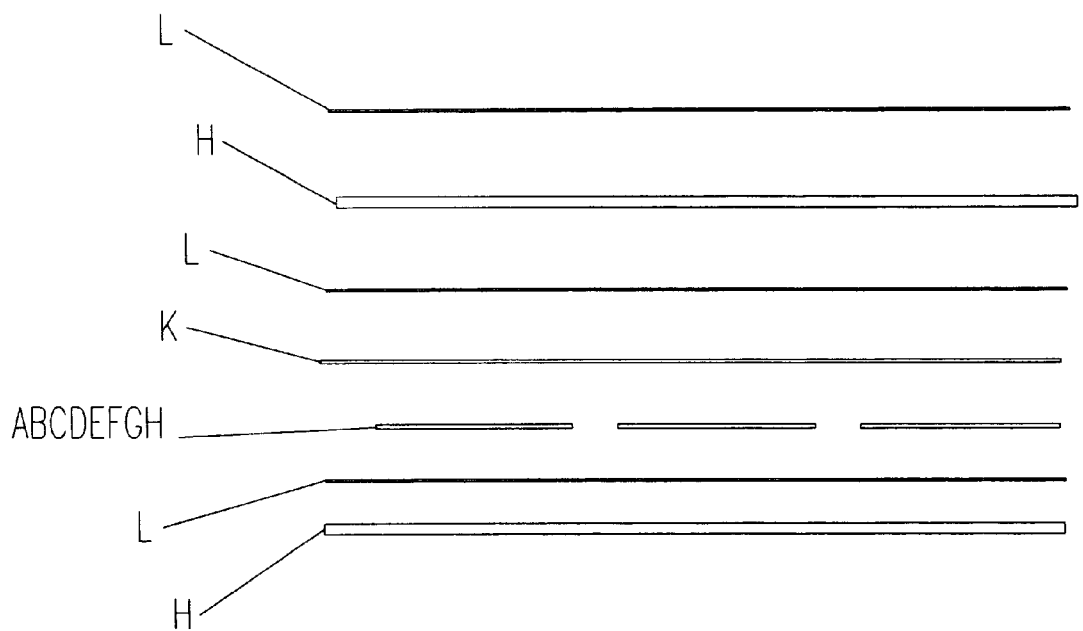
FIG. 9 is a sectional view of the filter unit illustrating the laminated relationship of the layers thereof.

The printed circuit board 32 has an array of openings 44 which are in the same spatial relationship as the apertures 20 and are disposed along optical axes through the center of the apertures 20, as may be observed in FIG. 2 as well as in FIG. 4. The board 32 has printed wiring and electrical components, such as resistors and integrated circuit (IC) chips 48, mounted on the side of the board 32 facing the apertures 20. The photodetectors 38 are mounted on the opposite side of the board. An optical filter pack 50 is mounted on the side of the board 32 facing the apertured wall 18. The filter pack is a laminated, layered structure which is illustrated in FIGS. 8 and 9. There are 7 sheets of filter material, A to G. These may be composed of gelatin and each provides a different long-pass or edge-type optical filter. Such gelatin filters are much lower in cost than thin-film filters which are used in most contemporary colorimeters. Filters employing transmissive colored inks may also be used. The filters are retained in a layered structure having openings in like positional relationship to the apertures 18 and the holes 44 so that when the filter 50 is mounted on the board 32, the filter elements A through G are aligned with different ones of the holes. One of the holes in the layers laminated with the elements A to G is over an unmasked area M. This is the area and the hole 44 in aperture 20 approximately in the middle of the filter array. In one of the layers H, the notch 52 provides edges which facilitate placement and alignment of the filter pack 50 on the board 32.

The layers, which constitute the pack, are opaque (e.g., are black) layers H of a material such as polycarbonate sheet which are on the outside of the pack. One of these layers faces downwardly and the other may be covered by an adhesive layer L on the outside of the back. The adhesive may be a pressure-sensitive adhesive, which itself may be covered by release material so as to facilitate assembly of the filter pack 50 on the board 32. There is another adhesive layer which holds the filter elements A through G assembled with the front opaque layer H. There is a transparent layer K and an additional adhesive layer L in back of the transparent layer K and in front of the rear opaque layer H. With a suitable alignment tool, the layers may be laid up and pressed together so as to provide the filter pack 50. The filter pack may be reproduced in quantity, reliably and with accurate spacings and tolerances.

Figure 6:
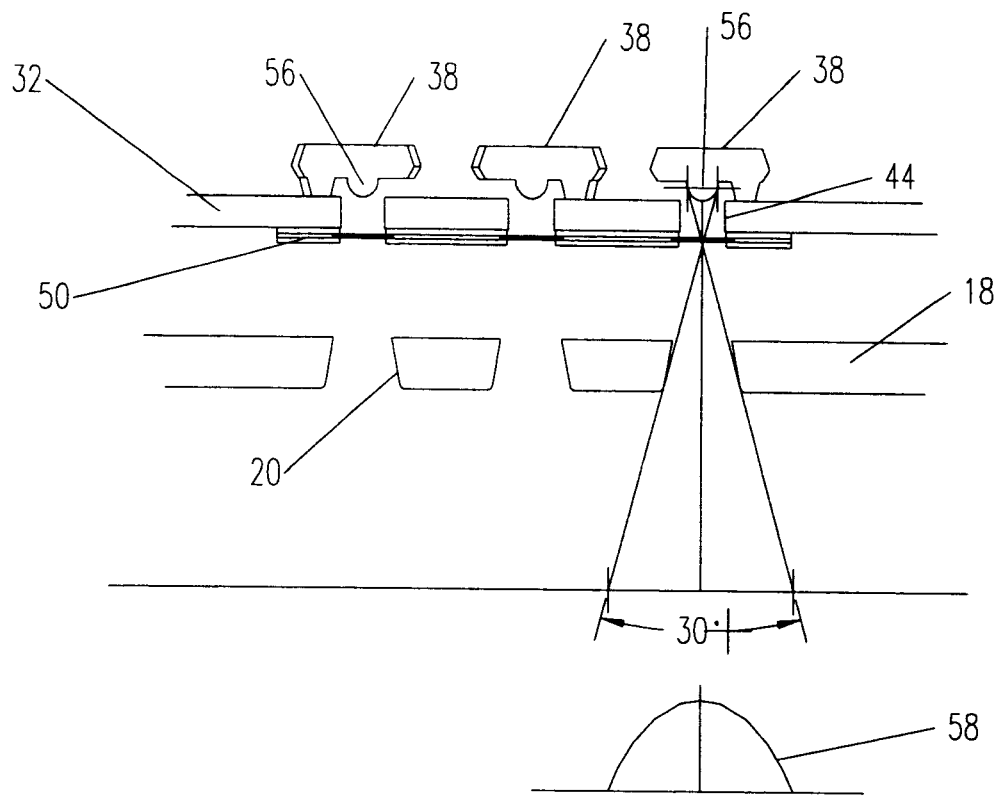
FIGS. 6 and 7 are ray diagrams illustrating how the apertures in the wall of the colorimeter through which light passes masks and restricts the field of view of the filter/photodetector pairs.
Figure 7:
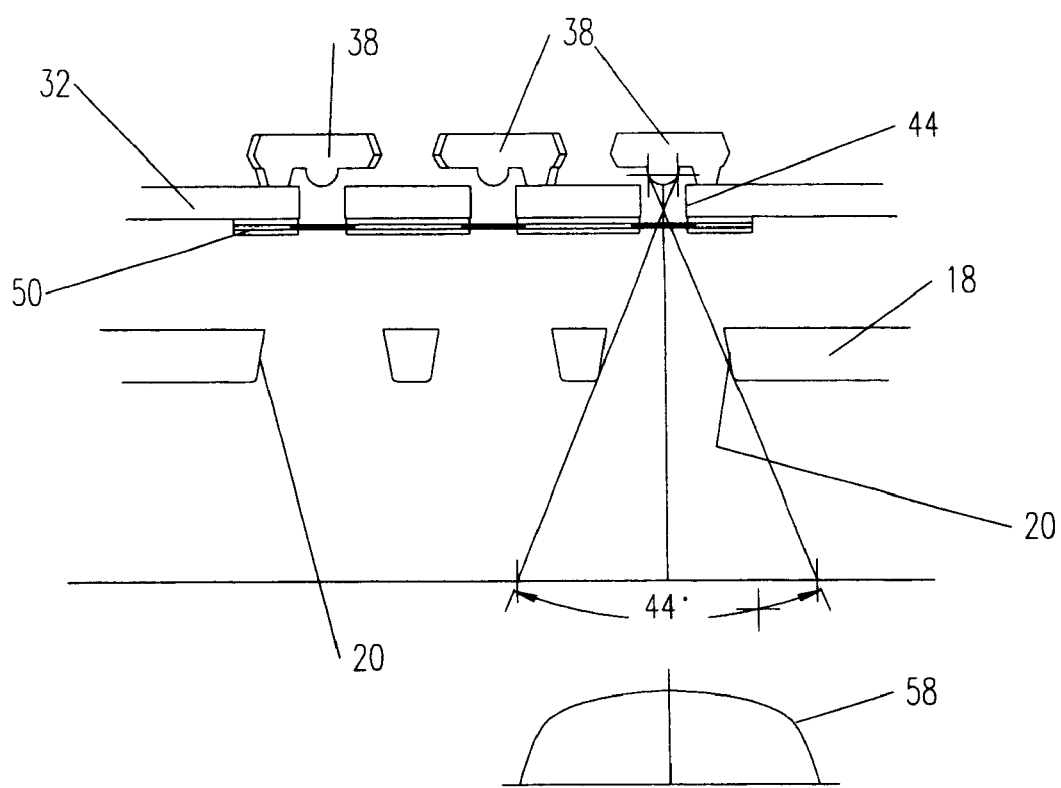

Referring to FIGS. 6 and 7, it will be observed that the photodetectors have lens elements 56 in front of the photodiodes thereof which enhance the amount of light collected (i.e., passing via the filter elements in the filter pack 50). By virtue of the shapes and spatial relationship of the board 32 and the wall 18, when the colorimeter is held on the screen of the monitor, or other source, from which light emanates and the apertures have their longitudinal axes approximately 45° to the horizontal, the apertures 20 subtend arcs of 30° (plus or minus 15°) along the vertical and 44° (plus or minus 22°) along the horizontal. The light from vertically spaced regions is therefore masked as shown by the curve 58 in FIG. 6 so as to prevent, not only crosstalk between light passing through different ones of the apertures, but also passing of light of modified color due to vertical spacing to the photodetectors 38. This is an advantage when screens of the type which exhibit color changes, such as of LCD displays, are being measured and/or calibrated.

Figure 10:
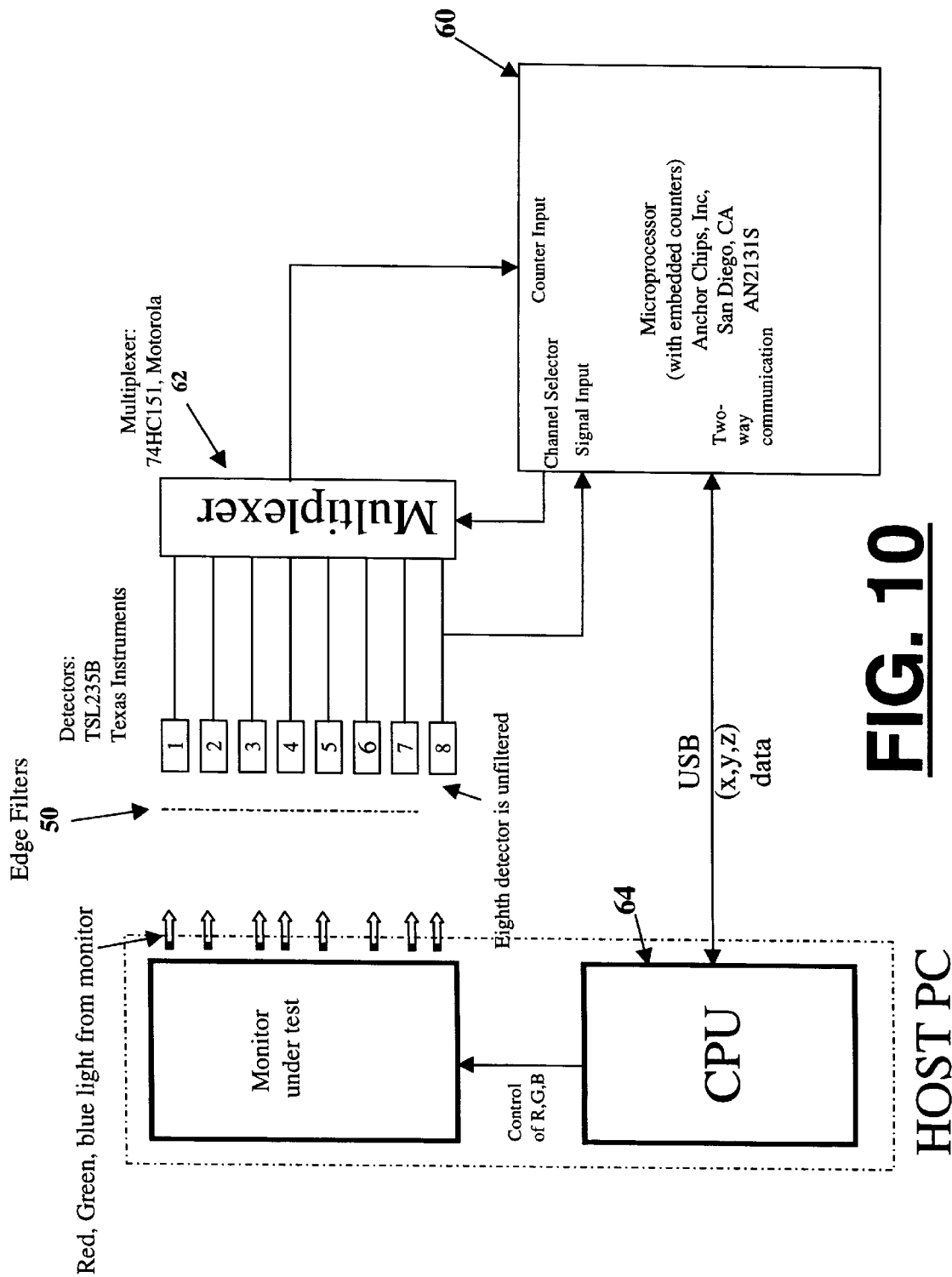
FIG. 10 is a block diagram schematically showing the circuitry of the colorimeter and the system for calibrating a monitor utilizing the outputs from the colorimeter.
Figure 11:
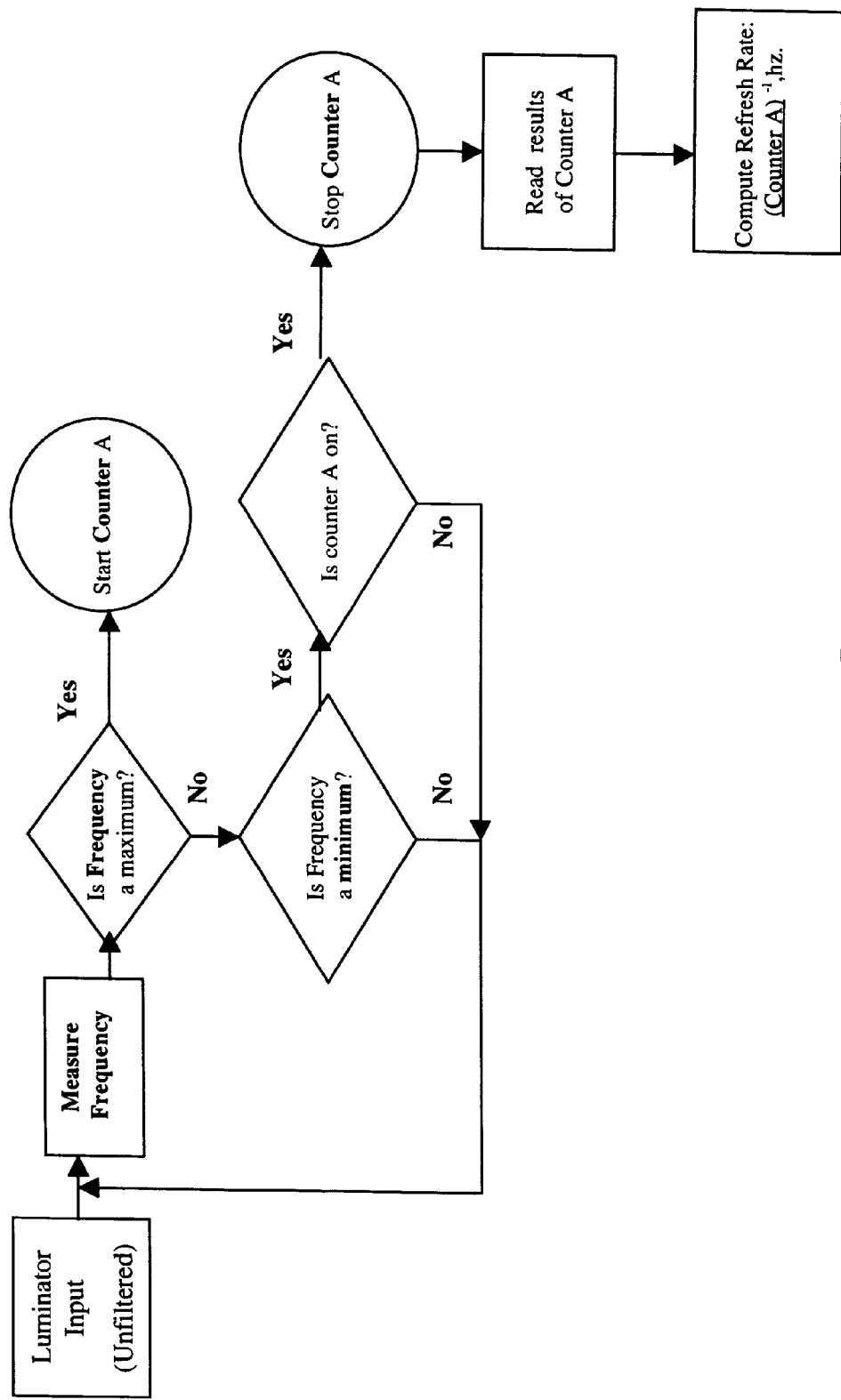
FIG. 11 is a flow chart illustrating programming of the microprocessor shown in FIG. 10 to obtain refresh rate probes.

The colorimetry system is shown in FIG. 10. This figure also shows how the colorimeter is used for calibrating a monitor so as to provide accurate color and gamma, in accordance with the CIE XYZ color system. The colorimeter system may be adapted to utilize other color systems such as the CIE L*a*b* and the CIE Luv color systems, if desired. The monitor under test may be a cathode ray tube monitor or an LCD monitor or display. In the event that a cathode ray tube monitor is used, it is desirable to make measurements over a large number, say 40 or more, refresh cycles or frames of the image. To that end, the refresh rate is detected in a microprocessor 60 of the system which may be programmed as shown in the flowchart of FIG. 11. An area or patch of the monitor screen equal to the area of the wall 18 carrying the apertures 20 (for example 1 inch square) is exposed to light from the monitor. The light passes through the edge filters of the pack 50 into the detectors 38. The detectors provide a digital output in the form of a pulse train of rate which depends upon the light intensity. By collecting or counting the pulses over intervals of time which may be related to the refresh rate, in the case of cathode ray tube monitors, digital outputs representing the light passing through each edge filter, as well as the unfiltered light, is obtained. The detectors 38 have their outputs multiplexed by a multiplexer 62 which provide trains of pulses sequentially over like intervals as provided for by the channel selector output from the microprocessor 60. The unfiltered light from the 8th detector 38 provides an output which is used for detecting refresh rate, as well as an effective edge filter output, which is used in synthesizing the response mimicking the CIE color system, namely the color matching functions. The microprocessor is connected to a host computer and particularly the CPU 64 thereof by a communications link such as the USB (Universal Serial Bus) or other communications link, for example an RS232 bus. The CPU 64 may communicate with the microprocessor 60 in order to retrieve the color measurements.

In calibrating the monitor, the CPU may first flash an all-red screen and instruct the microprocessor to extract spectral data. The CPU may then present entirely green, then blue screens, as well as multiple levels of a gray screen, varying from completely dark (red, green and blue controls at maximum).

Referring to FIG. 11, the refresh rate is obtained from the 8th detector output. The frequency or pulse repetition rate of the detector output is measured. When the rate reaches a maximum (when the first dip in the rate occurs), a counter A is started. The frequency continues to be measured until there is a rise in count rate, indicating a frequency or rate minimum. Then the counter is stopped. The refresh rate is thus detected at the high and low luminosity from the screen. This refresh rate may be used to control the sampling window of the multiplexer as well as to collect counts from each of the detectors during the colorimetry process.

Figure 12:
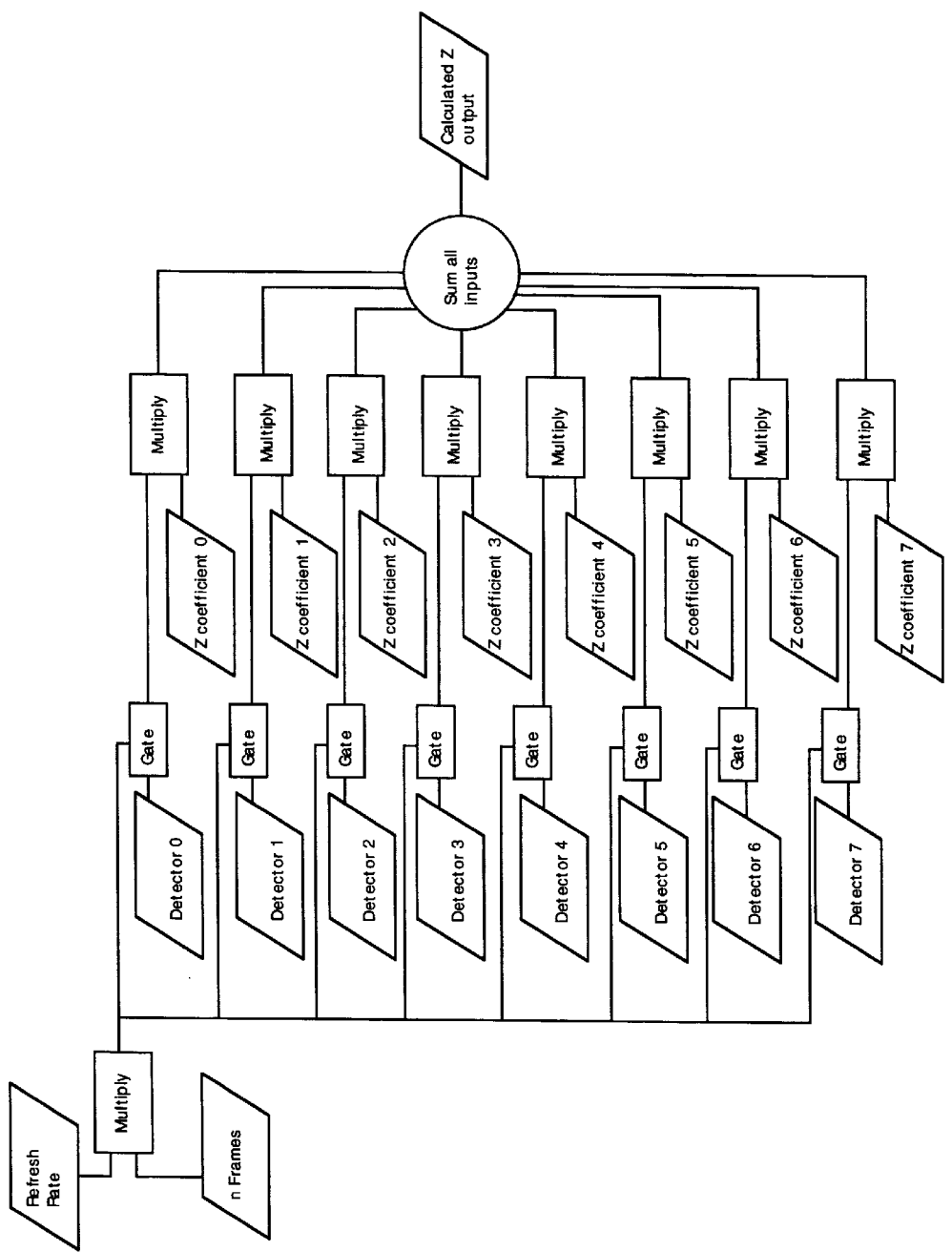
FIG. 12 is a flow chart illustrating the programming of the microprocessor to synthesize the response of the colorimeter and provide a response mimicking the CIE color matching functions.

FIG. 12 shows how the microprocessor 60 is programmed to mimic the z color matching function. The other color matching functions may be obtained by a similar program. The program uses different coefficients for the x, y and z functions. The computations carry out the equations set forth below for each filter detector pair, including the filter detector pair F/D0 which passes essentially the entire visible spectrum, while the other filter detector pairs pass successively smaller wavelength regions at the upper end of the spectrum. The regions are overlapping in that the portion of the spectrum passed by the upper edge filter detector pair of the 7th band (channel CHN-7) is overlapped, while only the first band (channel CHN-1) is overlapped by the unfiltered band or channel (CHN-0), that is the output from the F/D0 filter detector pair. The table of coefficients is, in general, set forth as the following table. It is a two-dimensional array of numbers stored in the microprocessor 60. These numbers are used as the coefficients in the algorithm set forth in the equations given below.

A two-dimensional array of numbers is stored in the microprocessor. These numbers are to be used as coefficients, $C_{an}*$ in the algorithm. They are:

| N | X | Y | Z |
|---|---|---|---|
| F/D0 | CX0 | CY0 | CZ0 |
| F/D1 | CX1 | CY1 | CZ1 |
| F/D2 | CX2 | CY2 | CZ2 |
| F/D3 | CX3 | CY3 | CZ3 |
| F/D4 | CX4 | CY4 | CZ4 |
| F/D5 | CX5 | CY5 | CZ5 |
| F/D6 | CX6 | CY6 | CZ6 |
| F/D7 | CX7 | CY7 | CZ7 |

ALGORITHM M $$\overline{X}(\lambda) = FD_0 * C_{X0} + FD_1 * C_{X1} + FD_2 * C_{X2} \ldots + FD_7 * C_{X7}$$
$$\overline{Y}(\lambda) = FD_0 * C_{Y0} + FD_1 * C_{Y1} + FD_2 * C_{Y2} \ldots + FD_7 * C_{Y7}$$
$$\overline{Z}(\lambda) = FD_0 * C_{Z0} + FD_1 * C_{Z1} + FD_2 * C_{Z2} \ldots + FD_7 * C_{Z7}$$

The co-efficients are derived by a least mean square fit to the color matching functions. The methodology which is used is described in a paper by D. O. Wharmby, entitled "Improvements in the Use of Filter Colorimeters" which appeared in the *Journal of Physics, E. Scientific Instruments*, 1975, Vol. 8, pages 41–44. In the Wharmby article, an attempt was made to mimic the functions using only six band pass filters. In accordance with the present invention, long pass or edge filters are used, which not only make the response which is precisely mimicked, but also enables the use of low cost edge filters, rather than band pass filters to pass the red, green and blue portions of the spectrum, respectively. The use of long-pass filters allows the freedom to select individual filters to match individual slopes of the CIE x y z (bar) curves. In contrast, a band-pass filter set forces one to make compromises on one slope to try to match a different slope of the same function.

Figure 14:
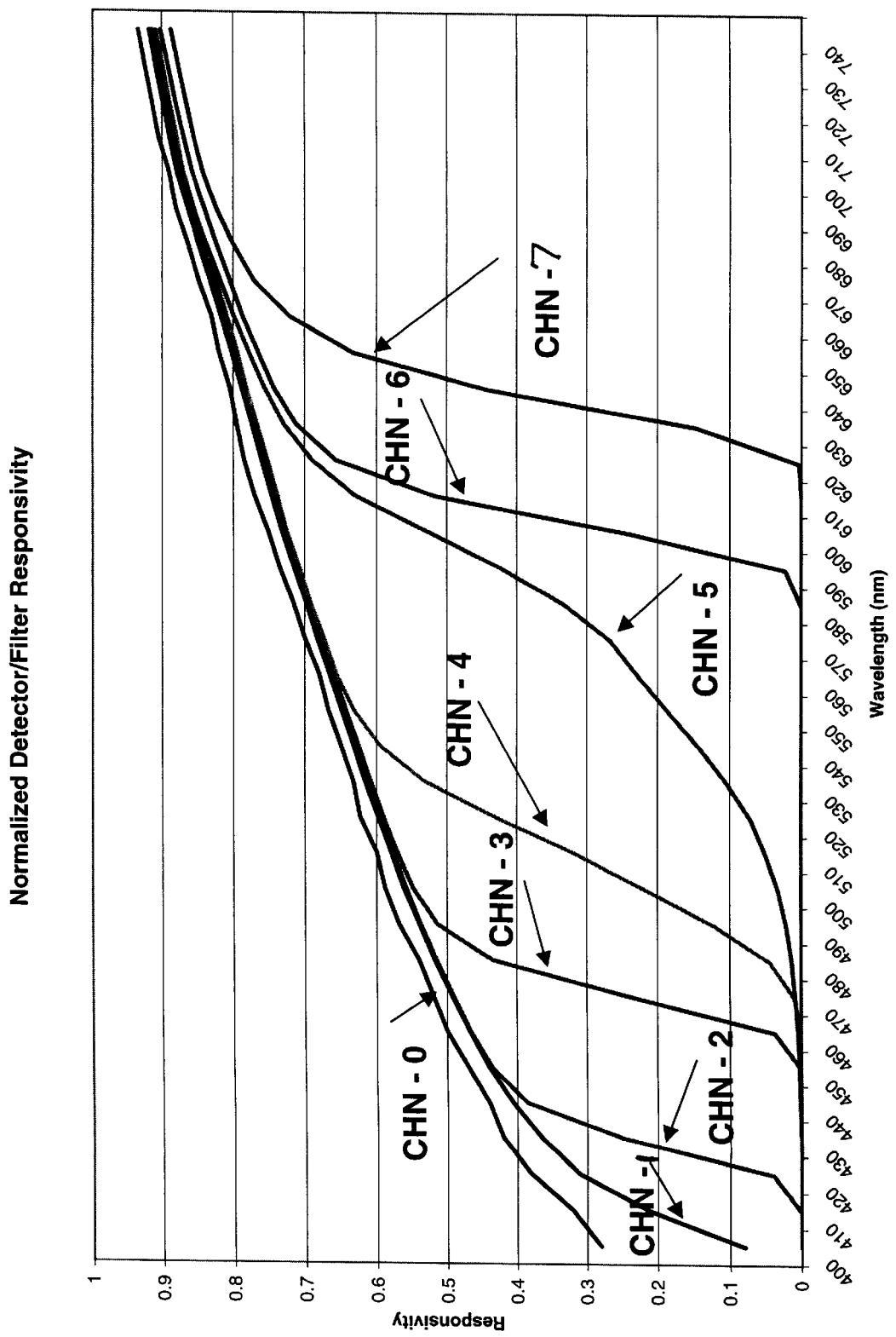

The following table indicates the coefficients which have been found suitable for filter detector pairs having the responsivities shown in FIG. 14.

Example of Coefficients

| | | | | | |
|---|---|---|---|---|---|
| CX0 = | −0.00097 | CY0 = | −0.00049 | CZ0 = | −0.0109 |
| CX1 = | 0.00961 | CY1 = | 0.00019 | CZ1 = | 0.07038 |
| CX2 = | 0.03507 | CY2 = | 0.0036 | CZ2 = | 0.15586 |
| CX3 = | −0.044 | CY3 = | 0.00214 | CZ3 = | −0.15754 |
| CX4 = | −0.01173 | CY4 = | 0.07195 | CZ4 = | −0.07174 |
| CX5 = | 0.13641 | CY5 = | −0.05846 | CZ5 = | 0.03593 |
| CX6 = | −0.06319 | CY6 = | −0.01143 | CZ6 = | −0.01658 |
| CX7 = | −0.05372 | CY7 = | −0.0134 | CZ7 = | 0.0009 |

Figure 13:
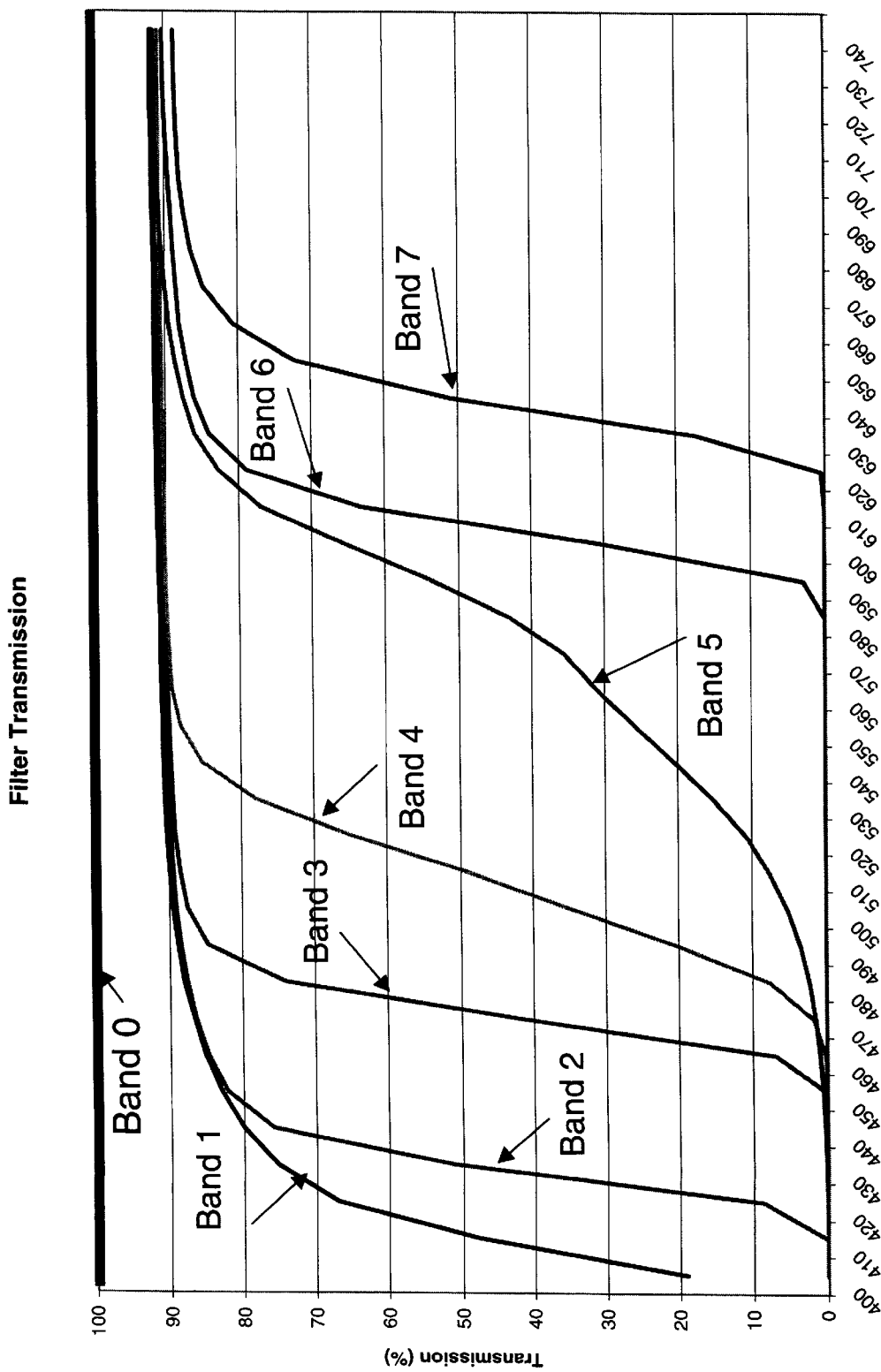
FIGS. 13, 14 and 15 are curves illustrating the filter transmisivity over the spectrum, the detector filter pair responsivity over the spectrum and the accuracy of mimicking the responsivity to the color matching functions.
Figure 15:
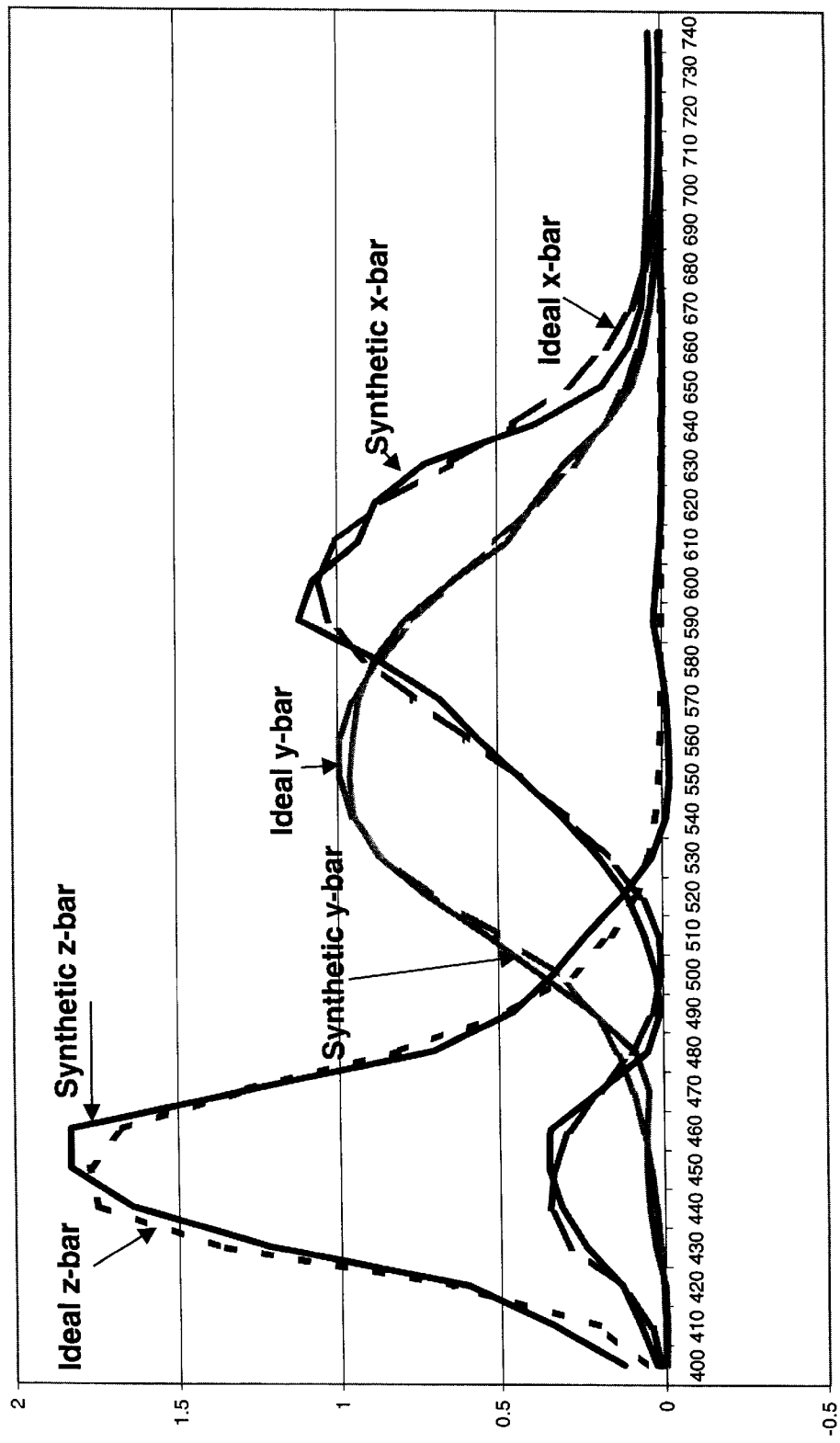

The response of the edge filters is shown in FIG. 13 for the unfiltered band and the band passed through the various filters in the filter pack 50. The slope of the skirts (rising edges) particularly for band 4 and 5, have been selected to facilitate the derivation of the coefficients to accurately mimic the color matching functions. The color matching functions are shown in FIG. 15 and the accuracy of the synthesized color matching functions (that is, how they compare to the ideal color matching functions) is shown in FIG. 15.

FIG. 14 illustrates the responsivity of the filter detector pairs. The detector imposes its own responsivity on the output which is obtained via the filters. The affect of the detector responsivity is that the filter/detector pair responsivity is the product of the detector responsivity with the filter transmission characteristics.

From the foregoing description, it will be apparent that there has been provided improved technology in colorimetry and particularly and improved digital colorimeter. Variations and modifications in the herein described colorimeter and its method of operation will undoubtedly suggest themselves to those skilled in the art. Accordingly, the foregoing description should be taken as illustrative and not in a limiting sense.

We claim:

1. A colorimeter comprising a plurality of optical filter/photodetector pairs, each having a responsivity which extends over different overlapping wavelength regions at longer wavelength ends of the visible spectrum, a translator converting the responsivity of said pairs into a responsivity mimicking a color matching function from which a tri-stimulus value can be provided when said pairs are exposed to light to be colormetrically measured.

2. The colorimeter according to claim 1 wherein said pairs provide a plurality of long-wavelength-pass electro-optical filters.

3. The colorimeter according to claim 2 wherein said pairs are disposed in an array.

4. The colorimeter according to claim 3 wherein there are at least three of said pairs.

5. The colorimeter according to claim 4 wherein one of said pairs has a responsivity extending over the entire visible spectrum.

6. The colorimeter according to claim 5 wherein said pairs are eight in number.

7. The colorimeter according to claim 4 wherein said pairs have fields of view along intersecting X-Y coordinates.

8. The colorimeter according to claim 6 wherein said pairs have fields of view along intersecting X-Y coordinates.

9. The colorimeter according to claim 7 wherein said fields of view are longer along one of said coordinates than along the other of said coordinates.

10. The colorimeter according to claim 9 wherein said fields of view are defined by apertures which are oblong in shape.

11. The colorimeter according to claim 10 wherein said shape has generally parallel sides and generally semi-circular ends.

12. The colorimeter according to claim 3, further comprising a housing having a wall, said apertures passing through said wall, a plate in said housing spaced from said plate, said plate having opposite sides, one facing toward said wall and the other facing away from said wall, passages in said plate in alignment with said apertures, the filters of said pairs being mounted on said one side of said plate, each over a different one of said passages, and the photodetectors of said pairs being mounted on said other side of said plate, also over said passages, said apertures defining fields of view for said photodetectors.

13. The colorimeter according to claim 12 wherein said apertures are shaped to subtend different solid angles in directions transverse to each other through said fields of view.

14. The colorimeter according to claim 13 wherein said angles are about +/−15° in one of said transverse directions, with respect to paths central of said fields of view and perpendicular to said plate and said angles being +/− about 22° along said path in the other of said transverse directions.

15. The colorimeter according to claim 12 wherein said housing has another wall facing said other side of said plate, members extending from said other wall to said plate and defining light blocking compartments encompassing said photodetectors.

16. The colorimeter according to claim 2 wherein said filters have skirts defining the lower wavelength ends of said passbands of said filters, said skirts having different slopes related to the shape of said function.

17. The colorimeter according to claim 2 wherein said function is one of said CIE color matching functions $\bar{x}(\lambda)$, $\bar{y}(\lambda)$, and $\bar{z}(\lambda)$.

18. The colorimeter according to claim 17 wherein said translator converts said responsivity of said pairs into responsivities mimicking all of said CIE color matching functions.

19. The colorimeter according to claim 12 wherein said housing has feet adjacent said wall thereof having said apertures therein, for removably attaching said colorimeter to a surface from which said light emanates.

20. The colorimeter according to claim 12 wherein said surface is presented by a luminous or emissive display.

21. The colorimeter according to claim 19 wherein said display is a rear projection or electro-luminescent display.

22. The colorimeter according to claim 19 wherein said surface is the screen of a color display selected from the group consisting of a cathode ray tube display and an LCD display.

23. The colorimeter according to claim 12 wherein said housing has a pair of shells which, when assembled together, define an enclosure closed to light except via said apertures.

24. The colorimeter according to claim 23 wherein said shells capture and hold said plate with said passages in alignment with said apertures.

25. The colorimeter according to claim 24 wherein said plate is a PC board having printed wiring and components mounted thereon and connected to said detectors.

26. The colorimeter according to claim 25 wherein said light emanates from a monitor and said detectors provide digital outputs, and wherein said components include a multiplexor connected to said detectors and a microprocessor to which said digital outputs are successively applied from said multiplexor and which microprocessor provides CIE tri-stimulus values X, Y and Z useful in calibrating said monitor when conditioned to display red, blue and green screens.

27. The colorimeter according to claim 17 wherein said light emanates from a color monitor and said detectors provide digital outputs and further comprising a multiplexor connected to said detectors and a microprocessor to which said digital outputs are successively applied via said multiplexor and which microprocessor provides CIE tri-stimulus values, X, Y and Z useful in calibrating said monitor when conditioned to display red, blue and green screens.

28. The colorimeter according to claim 27 further comprising means responsive to one of said photodetectors having a responsivity which extends over the entire visible spectrum for providing an output of controlling said multiplexor at a rate related to the refresh rate of said monitor.

29. The colorimeter according to claim 2 wherein said filters are provided by a plurality of layers in laminated relationship, one of said layers containing bodies of filter material of different transmisivity which defines the transmisivity of said filters.

30. The colorimeter according to claim 1 wherein said translator comprises means for multiplying outputs from said detector by different coefficients selected in accordance with said functions to provide product outputs, and means for summing said product outputs.

31. A colorimeter which comprises a plurality of photodetectors responsive to illumination from a surface segregated into different wavelength ranges, said photodetectors being disposed in side-by-side generally in the same plane, apertures in an array in alignment with said photodetectors, said apertures being of dimensions and spacing from said surface to define ray paths for said illumination from said surface which are at angles to said surface sufficiently steep to prevent illumination outside the range segregated for particular ones of said photodetectors from reaching other of said photodectors than said particular ones.

32. A colorimeter for measuring color temperature which comprises a plurality of filter/photodetector pairs, each having a responsivity which extends over different overlapping wavelength regions at longer wavelength ends of a spectrum the color temperature of which is to be measured by said colorimeter, a translator converting the responsivity of said pairs into a responsivity mimicking a color matching function from which values can be provided representing said color temperature.

33. The colorimeter according to claim 32 wherein said spectrum is that of an emissive source.

34. The colorimeter according to claim 33 wherein said emissive source is from the group consisting of a light source, a video display, a radiating body or black body.

35. A colorimeter for measuring color characteristics of an object comprising:
 a plurality of photodetectors for receiving optical signals from the object and generating output signals representative of the optical signals and the color characteristics of the object; and
 a plurality of filters, each filter being paired with oneof the plurality of photodetectors to filter the optical signals received thereby, the plurality of filters each having an optical transmission response that varies for a selected optical wavelength range, and the optical transmission response for all the plurality of filters overlapping at longer wavelengths of a visible spectrum.

36. The colorimeter as set forth in claim 35 wherein the optical transmission response of the plurality of filters provides output signals that substantially mimic a CIE color matching function.

37. The colorimeter as set forth in claim 35 wherein the optical transmission response of each of the plurality of filters increases toward the longer wavelengths of the visible spectrum and each filter allowing transmission of the longer wavelengths.

38. The colorimeter as set forth in claim 35 wherein the optical transmission responses of each of the plurality of filters are non-uniformly distributed across the visible spectrum to provide a colorimeter response that mimics CIE xyz bar functions.

39. The colorimeter as set forth in claim 35 further including a plurality of apertures for limiting a field of view of each of the plurality of photodetector and filter pairs reducing cross-talk therebetween.

40. The colorimeter as set forth in claim 35 further including an unfiltered photodetector that transmits substantially the visible spectrum.

41. A process for measuring a color of an object comprising the steps of:
 filtering light from the object with a plurality of filters, each filter having a light transmission response being non-uniformly distributed across a visible spectrum and each overlapping at longer wavelengths of the visible spectrum;
 detecting the filtered light; and
 generating output signals based on the detected filtered light which represent the color of the object.

42. The process of measuring a color as set forth in claim 41 further including calibrating the object based on the output signals.

43. The process of measuring a color as set forth in claim 41 wherein the generating includes synthesizing a color matching function that mimics a CIE color matching function.

44. The process of measuring a color as set forth in claim 41 wherein the filtering includes transmitting, by each of the plurality of filters, light having the longer wavelengths of the visible spectrum.

\* \* \* \* \*

UNITED STATES PATENT AND TRADEMARK OFFICE
CERTIFICATE OF CORRECTION

PATENT NO.  : 6,163,377
DATED       : December 19, 2000
INVENTOR(S) : Boles et al.

It is certified that error appears in the above-identified patent and that said Letters Patent is hereby corrected as shown below:

ON THE TITLE PAGE
Item Inventors

In the list of inventors, please delete "Merkle" and insert with --Merle--.

Signed and Sealed this

Twenty-ninth Day of May, 2001

Attest:

NICHOLAS P. GODICI

Attesting Officer          Acting Director of the United States Patent and Trademark Office